(12) United States Patent
Despins et al.

(10) Patent No.: US 9,820,600 B2
(45) Date of Patent: Nov. 21, 2017

(54) APPLICATOR TIP FOR DISPENSING SEAMING ADHESIVE TO SEAM ADJACENT PIECES OF FLOOR-COVERING MATERIAL AND METHOD FOR USING SAME

(71) Applicant: Omnimart Distributions Inc., Edmonton (CA)

(72) Inventors: David L. Despins, Edmonton (CA); Maurice L. Despins, Edmonton (CA)

(73) Assignee: Omnimart Distributions Inc., Edmonton, Alberta (CA)

(*) Notice: Subject to any disclaimer, the term of this patent is extended or adjusted under 35 U.S.C. 154(b) by 77 days.

(21) Appl. No.: 14/996,837

(22) Filed: Jan. 15, 2016

(65) Prior Publication Data
US 2016/0221026 A1    Aug. 4, 2016

Related U.S. Application Data

(60) Provisional application No. 62/104,191, filed on Jan. 16, 2015.

(51) Int. Cl.
*B29C 65/00* (2006.01)
*B29C 65/54* (2006.01)
(Continued)

(52) U.S. Cl.
CPC .......... *A47G 27/0487* (2013.01); *B29C 65/48* (2013.01); *B29C 65/524* (2013.01); *B29C 66/1142* (2013.01); *B29C 66/43* (2013.01); *B29C 66/836* (2013.01); *B29C 66/861* (2013.01); *E04F 21/165* (2013.01);
(Continued)

(58) Field of Classification Search
USPC ... 156/71, 305, 307.1, 307.3, 538, 544, 546, 156/547, 574, 587
See application file for complete search history.

(56) References Cited

U.S. PATENT DOCUMENTS 5,250,145 A * 10/1993 Despins ............. A47G 27/0487
156/304.1
7,381,289 B2 * 6/2008 Despins ............... A47G 27/045
156/304.3

FOREIGN PATENT DOCUMENTS

SU         1587195 A  *  8/1990  ................ B01F 5/02

OTHER PUBLICATIONS

English Abstract of SU 1587195 (May 28, 2017).*

* cited by examiner

*Primary Examiner* — Sing P Chan
(74) *Attorney, Agent, or Firm* — Dentons US LLP

(57) ABSTRACT

An applicator for dispensing seaming adhesive onto the edges of pieces of adjacent floor-covering material is provided. The applicator tip can include, from top to bottom, a leg portion, a relatively narrow ankle portion and a foot portion. The body can connect with a seaming adhesive dispensing device to allow seaming adhesive to flow into a passageway in the body. The ankle portion includes an orifice extending through the applicator tip from side-to-side and intersects with the passageway so that seaming adhesive can flow through the orifice. The foot portion includes a pair of opposing wedges extending sideways from the body. The applicator tip can be drawn along a line of abutment between adjacent pieces of floor-covering material. The ankle portion can further include a glue channel that directs the edges of the floor-covering material towards the orifice so that seaming adhesive can be dispensed along the edges and along the bottom surfaces of the edges.

21 Claims, 11 Drawing Sheets

(51) Int. Cl.
*A47G 27/04* (2006.01)
*E04F 21/165* (2006.01)
*B29C 65/48* (2006.01)
*B29C 65/52* (2006.01)
*E04F 15/16* (2006.01)
*B29L 31/00* (2006.01)
*B29C 65/42* (2006.01)

(52) U.S. Cl.
CPC .......... *B29C 65/42* (2013.01); *B29C 65/4815* (2013.01); *B29C 65/54* (2013.01); *B29L 2031/732* (2013.01); *E04F 15/16* (2013.01)

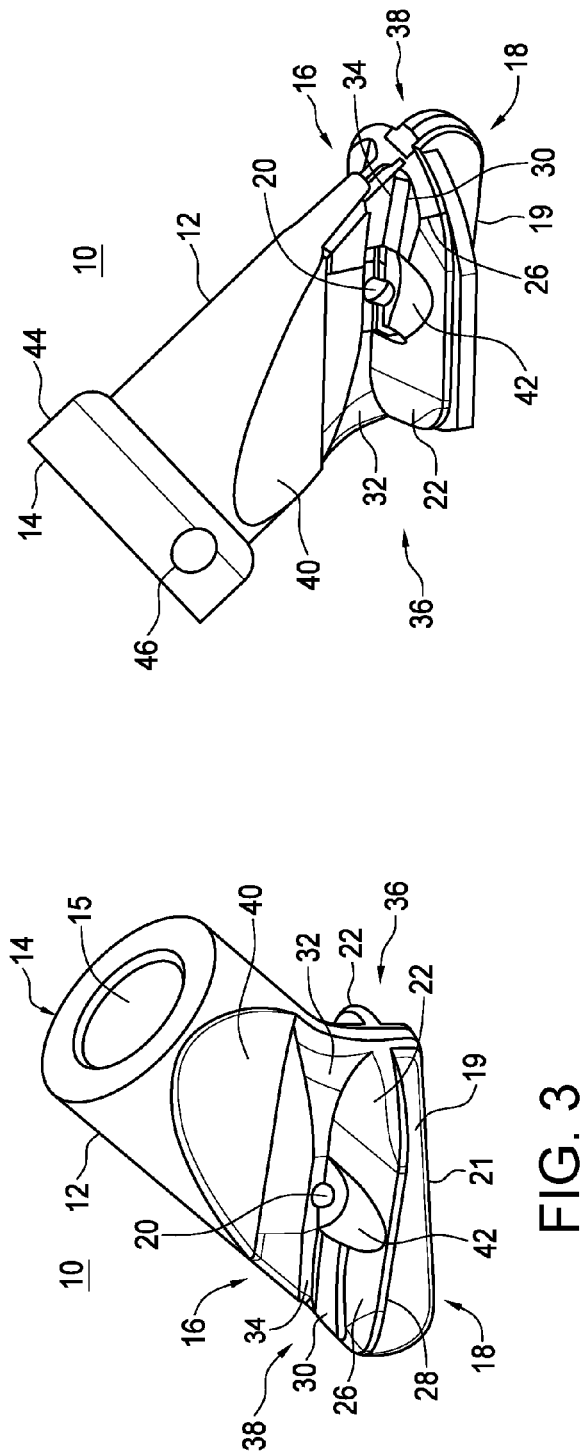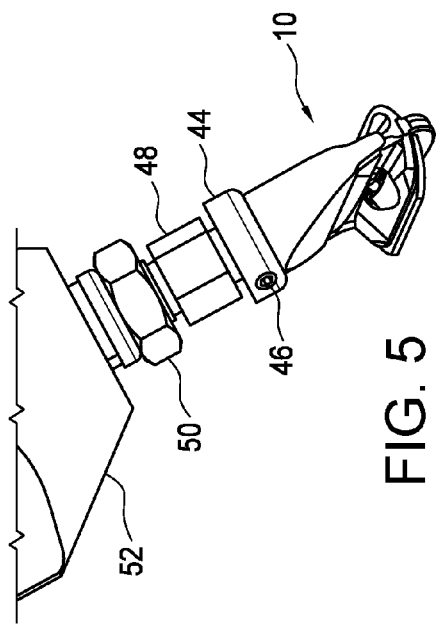

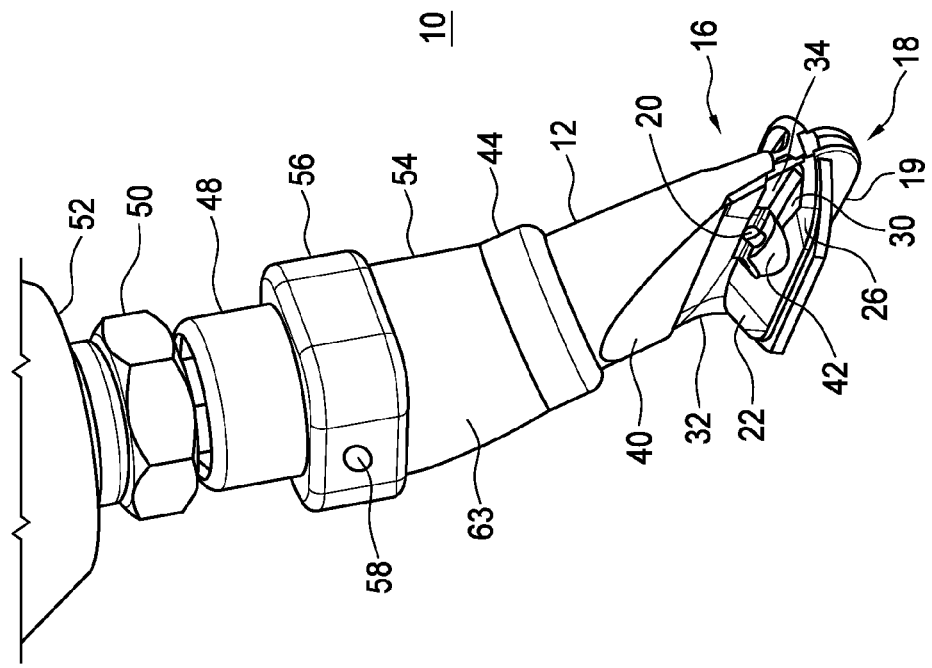
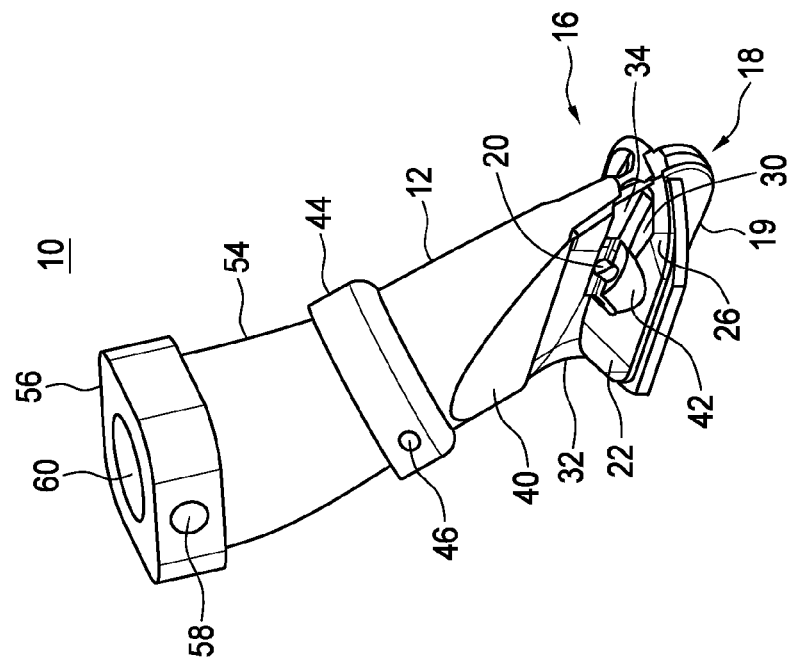

APPLICATOR TIP FOR DISPENSING SEAMING ADHESIVE TO SEAM ADJACENT PIECES OF FLOOR-COVERING MATERIAL AND METHOD FOR USING SAME

CROSS-REFERENCE TO RELATED APPLICATIONS

This application claims priority of U.S. provisional patent application Ser. No. 62/104,191 filed Jan. 16, 2015, which is incorporated by reference into this application in its entirety.

TECHNICAL FIELD

The present disclosure is directed to the field of applicator tips for use in seaming linearly abutting, side-by-side, planar layers of floor-covering with seaming adhesive, to form a finished seam along the line of abutment.

BACKGROUND

For purposes of this specification, "floor-covering" is intended to encompass both carpet and resilient flooring material. "Open seam" is intended to describe the gap formed between the vertical side edges of abutting layers of floor-covering, which gap appears when the marginal floor-covering portions adjacent the side edges are simultaneously raised by the tip passing thereunder. "Closed seam" is intended to describe the linear break between the abutting planar layers of floor-covering when they are lying flat on the sub-floor or underlay, with the side edges not yet bonded by adhesive. "Finished seam" is intended to describe the seam after applied adhesive has bonded the side edges. And "seaming adhesive" is intended to comprise liquid adhesives, thermoplastic adhesives (such as hot-melt glue) and any other form of adhesive used in the seaming of floor-covering materials as well known to those skilled in the art.

As a beginning point, it is useful to shortly describe the various forms of what is known in the industry as "resilient flooring" and to provide some background on the seaming techniques used in the past with that material. Resilient flooring is generic to: linoleum; rigid-backed vinyl (such as the material sold under the well-known trade-mark COR-LON); cushion backed vinyl; and homogeneous vinyl (which is a solid layer of vinyl).

Linoleum was commonly seamed by laying the vertical side edges of adjacent layers in close abutment, folding back the adjacent marginal portions of the floor-covering layers to expose the sub-floor, applying a band of water-resistant adhesive to the sub-floor along the line of abutment using a spatula-like tool called a "spreader", then bringing the marginal portions back down onto the sub-floor, and hand-rolling the seam to complete the operation.

The rigid-backed vinyl was seamed in the same fashion as the linoleum, except that an excess of the sub-floor adhesive was applied to the sub-floor along the line of abutment, with the hope that it would squeeze up between the abutting side edges when they were pressed down, to seal and bond them together.

In the case of the cushion-backed vinyl, the marginal portions were first laid flat on the adhesive-coated sub-floor, in the same manner as linoleum. An applicator was then used to apply low viscosity, solvent-base, liquid seaming adhesive into the closed seam. The applicator comprised a plastic squeeze bottle having a hollow, knife blade-like tip. The cushion-backed vinyl could be laterally compressed slightly, to allow penetration of the tip for application of the liquid adhesive.

In the case of the homogeneous vinyl, a narrow groove would be cut along the seam, a bead of vinyl would be laid into the groove and a hot iron would be used to melt the bead and adjacent material to thereby weld the side edges together.

From the foregoing, it will be understood that seaming involved bonding the undersurface of the floor-covering to the sub-floor with pre-applied thick adhesive and bonding the vertical side surfaces together, either by application of low viscosity, liquid adhesive or by heat welding the vinyl edges.

In the mid-eighties one of the present applicants developed a novel applicator tip for use with homogeneous vinyl. This tip was disclosed in U.S. Pat. No. 4,484,976, issued Nov. 27, 1985, which is incorporated by reference herein. Also incorporated by reference herein are the within applicant's U.S. Pat. No. 5,250,145 issued on Oct. 5, 1993; U.S. Pat. No. 6,997,227 issued on Feb. 14, 2006; and U.S. Pat. No. 7,381,289 issued on Jun. 3, 2008.

Referring to FIG. 1, a "prior art" applicator tip is shown. This prior art applicator tip was designed to wet the vertical side edges of the floor-covering with a solvent-base liquid seaming adhesive. The prior art tip was adapted to raise the flat marginal portions of the floor-covering as it passes along the seam, thereby exposing the vertical side edges while wetting them with seaming adhesive. More particularly, an installer inserts the prior art tip between the floor-covering side edges and beneath the adjacent marginal portions. He then pulls the prior art tip along the seam. The prior art tip is connected at its upper end to a plastic squeeze bottle containing a supply of seaming adhesive. The prior art tip forms a longitudinal passageway having an outlet positioned to deliver the seaming adhesive to the faces of the floor-covering side edges. The installer manually squeezes the bottle as the applicator tip is drawn along the line of abutment, to discharge the seaming adhesive.

Structurally, the prior art tip comprises an upstanding, body having, from top to bottom, a leg portion, a relatively narrow ankle portion, and a pair of opposing wedges extending from the ankle portion. The leg portion comprises coupling means at its upper end for connecting it with the seaming adhesive supply squeeze bottle, a longitudinal open-ended passageway extending downwardly through the leg, and an orifice extending through the ankle portion having communication with the longitudinal passageway to allow seaming adhesive to flow out the orifice on each side of the ankle onto the edges of the floor-covering being seamed together.

The prior art tip has worked well when used with homogeneous vinyl using solvent-based liquid seaming adhesive but, when applied to carpeting and other resilient flooring, certain problems have become evident. More particularly: the ankle portion has had to be kept quite narrow (typically ¹⁄₁₆"). If this is not done, the seam will open too much as the tip is moved along it. An excessive amount of seaming adhesive can then readily move down the passageway and into the open seam (this excessive flow is referred to as "flooding"). In the case of carpet, when the upraised marginal portions of the floor-covering drop back down to the sub-floor after the tip has passed, the excess seaming adhesive can get squeezed upwardly and will wick into the pile. The installer can then attempt to clean off the surface adhesive, but this is time-consuming, expensive and rarely complete. The presence of seaming adhesive on top of the seam will result in flattening of the pile fibers with traffic, thereby creating an undesired, hard, lumpy ridge running along the seam. In the case of resilient flooring, excess seaming adhesive will accumulate on top of the finished seam and is wasted and must be removed; flooding is also partly a result of having to use low viscosity, solvent-based, liquid seaming adhesive. These seaming adhesives will readily flow down the passageway and through the outlet or orifice into the open seam. It has not been possible to substitute a high viscosity, water-based liquid seaming adhesive for use with the prior tip, as it will not flow at a sufficient rate through the narrow ankle passageway and orifice (which typically has a diameter of about 0.040"). It would be desirable to use a high viscosity, water-based seaming adhesive, because it is less toxic than the solvent-based seaming adhesive. However, this has been deterred because a passageway of greater cross-section would require a thicker ankle portion, which would result in opening the seam wider, thereby inducing an unacceptable degree of flooding.

In addition, it is desirable, with resilient flooring and carpet, to apply some of the sealant to the undersurface of the marginal portions of the floor-covering, to enhance the strength and durability of the seam. Attempts to accomplish this end with the prior art tip, by delivering more sealant, simply result in more excess seaming adhesive reaching the top surface of the seam. Since the sub-floor is normally coated with a tacky adhesive, when the prior art tip is pressed down against the sub-floor and pulled along the seam the sub-floor adhesive will drag on the prior art tip and will also ball up beneath it. This commonly causes the installer using the prior art tip to lift it out of contact with the sub-floor during use. Several problems can then result. The floor-covering side edges can be spread too far apart; with the consequence that severe flooding will follow. Furthermore, the installer will have to manually press down the wetted edges as he proceeds. This means that the installer has to hold the bottle and tip with one hand, using that hand to squeeze the bottle, while he uses the other hand to press down the wetted side edges. All of this is tiring over time and requires a significant level of skill on the part of the installer. In addition, when the prior art tip is lifted, it has a tendency to skew, with the result that the application of sealant to the two side edges is somewhat uneven and erratic.

On large floor surfaces, floor-covering is installed in multiple pieces in order to fully cover the surface. During installation, the edges of the abutting layers of floor-covering are bonded or "seamed" together to form a contiguous layer of floor-covering over the floor surface. This requires that there are minimal or no gaps along the closed seam. Often, the closed seam is formed by overlapping one layer of floor-covering over another and then cutting both layers at once. This produces a closed seam that has virtually no gaps along its length. Typically, resilient flooring is seamed by laying the vertical edges of adjacent and abutting layers in close contact, folding back the adjacent marginal portions of the floor-covering to expose the sub-floor, applying a band of flooring adhesive along the line of abutment using a spreader and then bringing the marginal portions back together onto the sub-floor and rolling the seam with a hand roller to ensure adhesion between the floor-covering and the sub-floor. With certain types of resilient flooring, it is necessary that some adhesive squeeze up along the line of abutment thereby gluing the edges of abutting layers to each other in addition to the sub-floor. This technique is used in the installation of carpet as well.

This method is usually performed in stages or portions along the line of abutment. Adhesive is first applied to a span of approximately 12" to 18" and then the edges of the floor-covering are manually brought into close contact with one another and then hand-rolled to form the finished seam. This process is repeated along the line of abutment until the finished seam is completed. One problem with the prior art tip is that the adhesive dispenser attached to the prior art tip is oriented upwards at an angle leading in the direction that the prior tip follows to form the finished seam. As the dispenser and prior tip are advanced along the line of abutment towards a wall, the dispenser prevents the prior art tip from being advanced right up tight to the wall. To finish the seam, the prior art tip must then be turned around 180 degrees and be advanced backwards from the wall towards the point where it was stopped previously.

In the art of installing floor-covering, it is also known to use a backing tape to reinforce a finished seam. This involves applying the backing tape to the back of the floor-covering along the line of abutment. The backing tape reinforces the finished seam to provide additional resistance against the adjacent layers being pulled apart. The current method of installing a backing tape involves gluing the backing tape to the sub-floor or pad underneath the line of abutment with a floor adhesive. The marginal edge portions of the floor-covering are then glued to the backing tape.

The backing tape itself can be comprised of lines or strips of thermoplastic adhesive on its top surface running along its length. To activate the thermoplastic adhesive so that the floor-covering will bond to the backing tape, a heating iron is placed in the open seam between the floor-covering and the backing tape. The iron heats the thermoplastic adhesive until it becomes molten. The iron is then manually drawn along the backing tape to heat a portion of the backing tape adhesive. While the thermoplastic adhesive is still molten, the edges of the abutting floor-covering layers are fitted to one another and then hand-rolled such that the marginal edge portions are brought into contact with the molten adhesive and are bonded to the backing tape as the adhesive cools and sets.

There are a number of disadvantages with this method. First, no adhesive is placed between the abutting edges of the floor-covering. The only bonding that occurs is between the bottom surface of the marginal portions of the floor-covering and the backing tape. Second, there is a risk that the heat produced by the iron to melt the thermoplastic adhesive will melt or burn the floor-covering itself. Third, this method is difficult to use when making finished seams that are curved. The bulkiness of the backing tape with thermoplastic adhesive makes the tape difficult to bend and form curves. Fourth, gluing the backing tape to the sub-floor or pad makes it difficult to move the backing tape once the floor adhesive begins to set to compensate for any adjustments in placement of the floor-covering when the finished seam is formed. Lastly, this method of installation is awkward and requires considerable skill to produce a finished seam.

It is, therefore, desirable to provide an applicator tip that overcomes these problems and that can be used with floor-coverings such as carpet and resilient flooring and which is adapted to be used with high viscosity, water-based liquid seaming adhesives.

SUMMARY

A seaming adhesive applicator tip is provided for dispensing seaming adhesive onto the edges of pieces of adjacent floor-covering material. In one embodiment, the applicator tip can comprise, from top to bottom, a leg portion, a relatively narrow ankle portion and a foot portion. The leg portion can connect with a seaming adhesive dispensing device to allow seaming adhesive to flow into a passageway in the body. The leg portion can further comprise opposing sidewalls that slope inwardly from an upper end of the leg portion downwardly to the ankle portion. The ankle portion can comprise an orifice extending through the applicator tip from side-to-side that intersects with the passageway so that seaming adhesive can flow through the orifice. The foot portion can comprise a pair of opposing wedges extending sideways from the body. The applicator tip can be drawn along a line of abutment between adjacent pieces of floor-covering material. The ankle portion can further comprise a glue channel that directs the edges of the floor-covering material towards the orifice so that seaming adhesive can be dispensed along the edges and along the bottom surfaces of the edges. The foot portion can further comprise a keel extending along a flat bottom surface thereof, wherein the keel can rise in elevation with respect to the flat bottom surface extending from a trailing edge to a leading edge of the applicator tip.

Broadly stated, a seaming adhesive applicator tip can be provided for seaming abutting side-by-side pieces of floor-covering planar material with adhesive along a line of abutment, the applicator tip comprising: an upright body comprising, from top to bottom, a leg portion, a relatively narrow ankle portion, and a foot portion, the body having a leading edge and a trailing edge which are aligned with the line of abutment; the leg portion forming a passageway extending longitudinally therethrough, the leg portion comprising connection means at its upper end for connection with a seaming adhesive dispenser, whereby seaming adhesive may flow from the dispenser into the leg passageway; the foot portion having a pairing of opposing wedges extending sideways from the body for uplifting and tilting the edges of the pieces of floor-covering material upwards and bringing the edges close to the ankle portion side surfaces as the applicator tip is advanced along the line of abutment, each of the wedges further comprising a downward sloping top surface and a flat bottom surface, the wedges further comprising a first recessed area disposed on a portion of the top surface nearer the trailing edge, the foot portion further comprising a keel extending downwards therefrom, wherein the keel is angled with respect to the flat bottom surface; and the ankle portion comprising having an ankle orifice extending through the ankle portion transverse to the line of abutment and intersecting with the passageway, the bottom edge of the ankle orifice further intersecting with the recessed area, whereby seaming adhesive flowing into the passageway is directed through the ankle orifice towards the edges of the pieces of floor-covering being seamed together and the bottom surfaces thereof.

Broadly stated, in some embodiments, the applicator tip can further comprise a second recessed area disposed on the top surface adjacent to the ankle orifice.

Broadly stated, in some embodiments, the ankle portion can further comprise a glue channel disposed thereon for guiding the pieces of floor-covering material along the ankle orifice.

Broadly stated, in some embodiments, the glue channel can further comprise a glue channel opening disposed on the leading edge of the body.

Broadly stated, in some embodiments, the glue channel opening can be wider than the glue channel and can further gradually narrow to the width of the glue channel to guide pieces of floor-covering material into the glue channel.

Broadly stated, in some embodiments, the angled keel can rise in elevation with respect to the flat bottom surface from the trailing edge to the leading edge.

Broadly stated, in some embodiments, the applicator tip can further comprise opposing and inwardly sloping sidewalls disposed on opposing sides of the leg portion, wherein the applicator tip narrows in width from an upper end of the leg portion downwardly to the ankle portion.

Broadly stated, in some embodiments, the leg portion can further comprise an elbow configured to extend the foot portion away from the leg portion.

Broadly stated, in some embodiments, the elbow can further comprise a swivel member to enable the ankle and foot portions to swivel about an axis relative to the upper end of the leg portion.

Broadly stated, in some embodiments, a method is provided for seaming adjacent pieces of floor-covering planar material, the method comprising the steps of: fitting the adjacent pieces of floor-covering planar material together wherein edges of the adjacent pieces are abutted to one another; providing a seaming adhesive applicator tip for seaming the abutting side-by-side pieces of floor-covering planar material with adhesive along a line of abutment, the applicator tip comprising: an upright body comprising, from top to bottom, a leg portion, a relatively narrow ankle portion, and a foot portion, the body having a leading edge and a trailing edge which are aligned with the line of abutment, the leg portion forming a passageway extending longitudinally therethrough, the leg portion comprising connection means at its upper end for connection with a seaming adhesive dispenser, whereby seaming adhesive may flow from the dispenser into the leg passageway, the foot portion having a pairing of opposing wedges extending sideways from the body for uplifting and tilting the edges of the pieces of floor-covering material upwards and bringing the edges close to the ankle portion side surfaces as the applicator tip is advanced along the line of abutment, each of the wedges further comprising a downward sloping top surface and a flat bottom surface, the wedges further comprising a first recessed area disposed on a portion of the top surface nearer the trailing edge, the foot portion further comprising a keel extending downwards therefrom, wherein the keel is angled with respect to the flat bottom surface, and the ankle portion comprising having an ankle orifice extending through the ankle portion transverse to the line of abutment and intersecting with the passageway, the bottom edge of the ankle orifice further intersecting with the recessed area, whereby seaming adhesive flowing into the passageway is directed through the ankle orifice towards the edges of the pieces of floor-covering being seamed together and the bottom surfaces thereof; placing the applicator tip between the abutting side-by-side pieces of floor-covering planar material and dispensing adhesive along the edge and the bottom surface of at least one piece of floor-covering material; and pressing the edges of the abutting side-by-side pieces of floor-covering planar material until the adhesive has at least partially set so as to form a finished seam along the line of abutment.

Broadly stated, in some embodiments, the method can further comprise the step of dispensing adhesive on the abutting edges of both side-by-side pieces of floor-covering planar material.

Broadly stated, in some embodiments, the step of forming the finished seam along the line of abutment can further comprise the step of advancing the applicator tip from one end of the line of abutment towards an opposite end thereof.

Broadly stated, in some embodiments, the step of forming the finished seam can further comprise the step of seaming successive portions of the abutting side-by-side pieces of the floor-covering planar material one portion at a time.

BRIEF DESCRIPTION OF THE DRAWINGS

FIG. 3 is a rear perspective view depicting the applicator tip of FIG. 2.

FIG. 4 is a front perspective view depicting the applicator tip of FIG. 3.

FIG. 5 is a perspective view depicting the applicator tip of FIG. 2 attached to a glue gun.

FIG. 8 is a front perspective view depicting a third embodiment of a seaming adhesive applicator tip.

FIG. 9 is a front perspective view depicting a fourth embodiment of a seaming adhesive applicator tip attached to a glue gun.

DETAILED DESCRIPTION OF EMBODIMENTS

Figure 2:
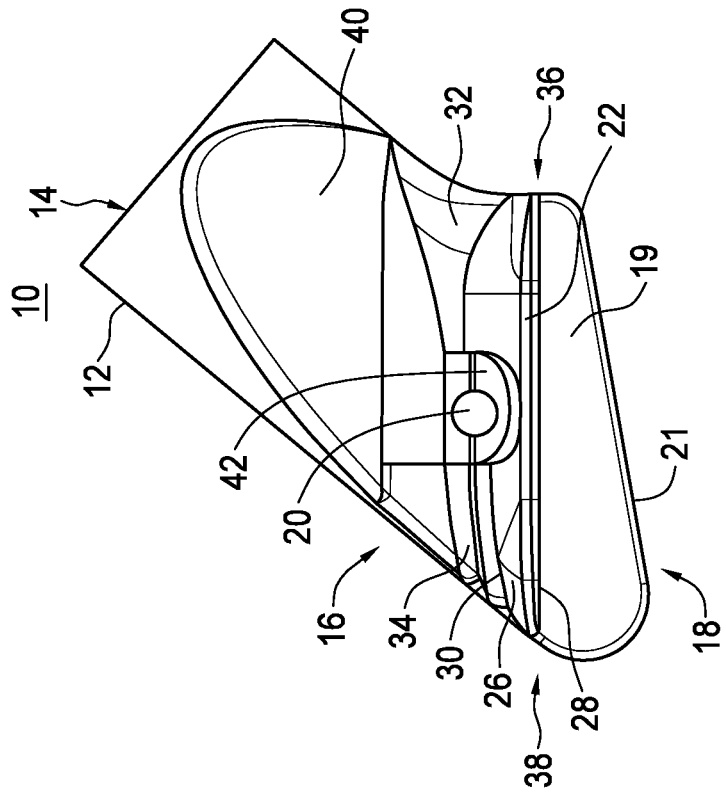
FIG. 2 is a side elevation view depicting one embodiment of a seaming adhesive applicator tip.

Referring to FIGS. 2 and 3, one embodiment of seaming adhesive applicator tip 10 is illustrated. In this embodiment, applicator tip 10 can comprise, broadly speaking from top to bottom, leg portion 12, ankle portion 16 and foot portion 18.

Leg portion 12 can comprise end face 14, which can further comprise coupling means for attaching to, and detaching from, a squeeze bottle containing seaming adhesive (not shown) or to a thermoplastic adhesive dispensing device, such as a hot melt glue gun (not shown). In some embodiments, end face 14 can be in communication with passageway 15 that can extend through leg portion 12 to ankle portion 16 inside applicator tip 10. In other embodiments, passageway 15 can comprise a diameter that can be tapped for ⅜"-16 threads to accommodate being threaded onto a hot melt glue gun (not shown) or a cold glue squeeze bottle (not shown).

In some embodiments, ankle portion 16 can comprise leading edge 36 and trailing edge 38. Ankle orifice 20 can extend through ankle portion 16 and intersect with passageway 15 inside applicator tip 10. Ankle portion 16 can be disposed above foot portion 18, which can comprise a pair of opposing wedges 22 extending sideways from applicator tip 10, and keel 19 extending downwards therefrom. Each wedge 22 can comprise a sloping top surface 26 and flat bottom surface 28. Recessed area 30 can be disposed into top surface 26 of each wedge 22 to allow adhesive to flow more easily to the edges of floor-covering as applicator tip 10 moves along the seam. In some embodiments, applicator tip 10 can further comprise recess 42 disposed on top surface 26 of wedge 22, wherein recess 42 is disposed adjacent orifice 20 so that adhesive can flow therefrom to evenly band pressurized seaming adhesive onto the edges and bottom surface, or backing, of the floor-covering as applicator tip 10 moves along the seam. In addition, it is important to note that the pressure of the seaming adhesive can be maintained in recess 42. This, in combination with an angled keel 19, as described below, can create a wedge surface out of wedges 22 that is in contact with the bottom surface or backing of the floor-covering to apply or smooth out the seaming adhesive applied thereon as applicator tip 10 moves along the seam, not unlike a "squeegee". This can allow seaming adhesive to be applied to the bottom surface or backing of the floor-covering so as to adhere to a seaming tape placed beneath and along the line of abutment to aid in the seaming of the adjacent pieces of floor-covering.

Figure 1:
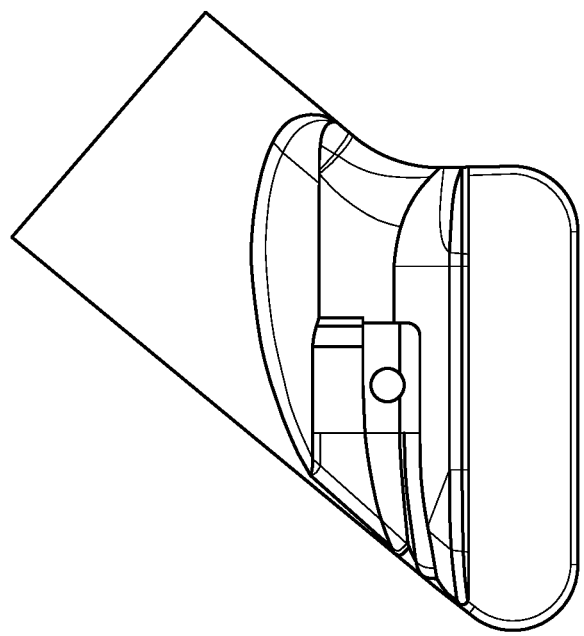
FIG. 1 is a side elevation view depicting a prior art applicator tip.

In some embodiments, keel 19 can be "angled" with respect to bottom surface 28, wherein bottom edge 21 of keel 19 can rise in elevation with respect to bottom surface 28 as keel 19 extends from trailing edge 38 to leading edge 36. By angling keel 19 in this manner, applicator tip 10 can be tilted downwards on its leading edge 36 side without raising orifice 20 relative to the edges of the floor-covering being seamed. The tilting of applicator tip 10 in this manner can occur inadvertently when an installer is moving applicator tip 10 along the seam, or when the installer rests the glue bottle or glue gun down upon completing at least a portion of the seam. If bottom edge 21 was parallel to bottom surface 28, as shown in the prior art tip in FIG. 1, then the downward tilting of applicator tip 10 on the leading edge side would have the undesirable result of raising orifice 20 upwards relative to the edges of the floor-covering being seamed together, wherein seaming adhesive can exit orifice 20 onto the top surface of the floor-covering.

In some embodiments, ankle orifice 20 can be disposed on ankle portion 16 such that a bottom portion of orifice 20 can intersect with recess 42. In a representative embodiment, ankle orifice 20 can have a diameter of approximately 5/64".

In another embodiment, ankle portion 16 can further comprise glue channel opening 32 on leading edge 36. In some embodiments, glue channel opening 32 can narrow as it gradually becomes glue channel 34 that extends towards trailing edge 38. In some embodiments, applicator tip 10 can further comprise opposing and inwardly sloping sidewalls 40 disposed on opposing sides of leg portion 12, wherein the width of applicator tip 10 gradually narrows from an upper end of leg portion 12, substantially adjacent end face 14, downwardly to ankle portion 16. Sloping sidewalls 40 can deflect carpet pile to allow the edges of floor-covering being seamed together to more easily move along glue channel 34, as compared to the prior art tip shown in FIG. 1.

Referring to FIG. 4, applicator tip 10 is shown further comprising collar 44, disposed on the upper end of leg portion 12, for attachment to a glue gun (not shown). Collar 44 can further comprise setscrew 46 for securing applicator tip 10 to the glue gun. Referring to FIG. 5, applicator tip 10 is shown attached to glue gun 52 via check valve 48 and coupler adaptor 50. In some embodiments, check valve 48 can comprise a ball and spring check valve, as well known to skilled in the art, to prevent hot melt adhesive from flowing out of applicator tip 10 when not being used by an installer. Upon the installer operating glue gun 52, the force of the hot melt adhesive being expelled by glue gun 52 can open check valve 48 and flow into applicator tip 10. Coupler 50 can comprise a coupling adaptor to compensate between the threaded coupling of glue gun 52 and applicator tip 10. It is obvious to those skilled in the art that multiple couplers 50 of differing sizes can be provided with applicator tip 10, as part of a kit, to provide means to attach applicator tip 10 to various glue guns of various makes and manufacture. It is further obvious to those skilled in the art that depending on the make and manufacture of glue gun 52, check valve 48 can directly couple to glue gun 52 without the need of using a coupler 50.

Figure 7:
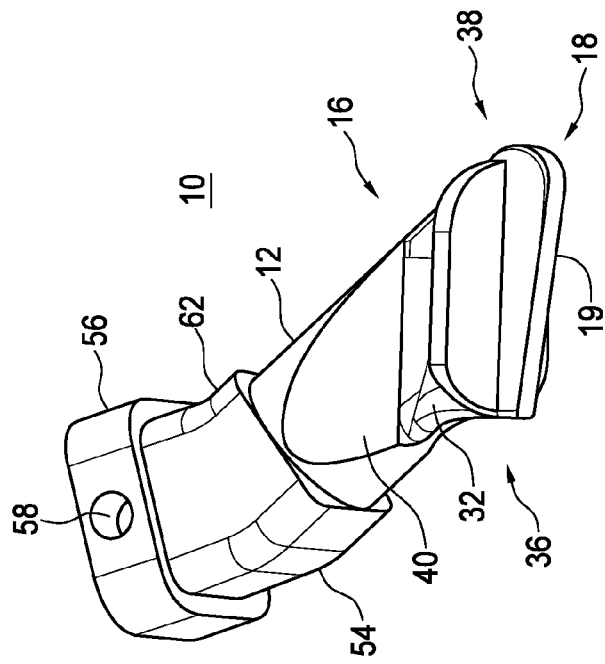
FIG. 7 is a bottom perspective view depicting the applicator tip of FIG. 6.
Figure 6:
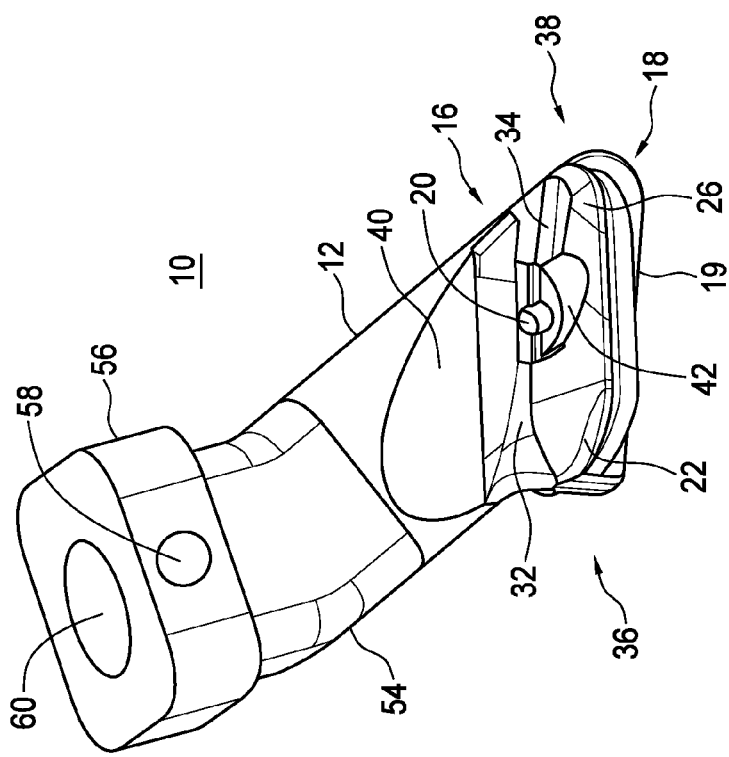
FIG. 6 is a side perspective view depicting a second embodiment of a seaming adhesive applicator tip.
Figure 13:
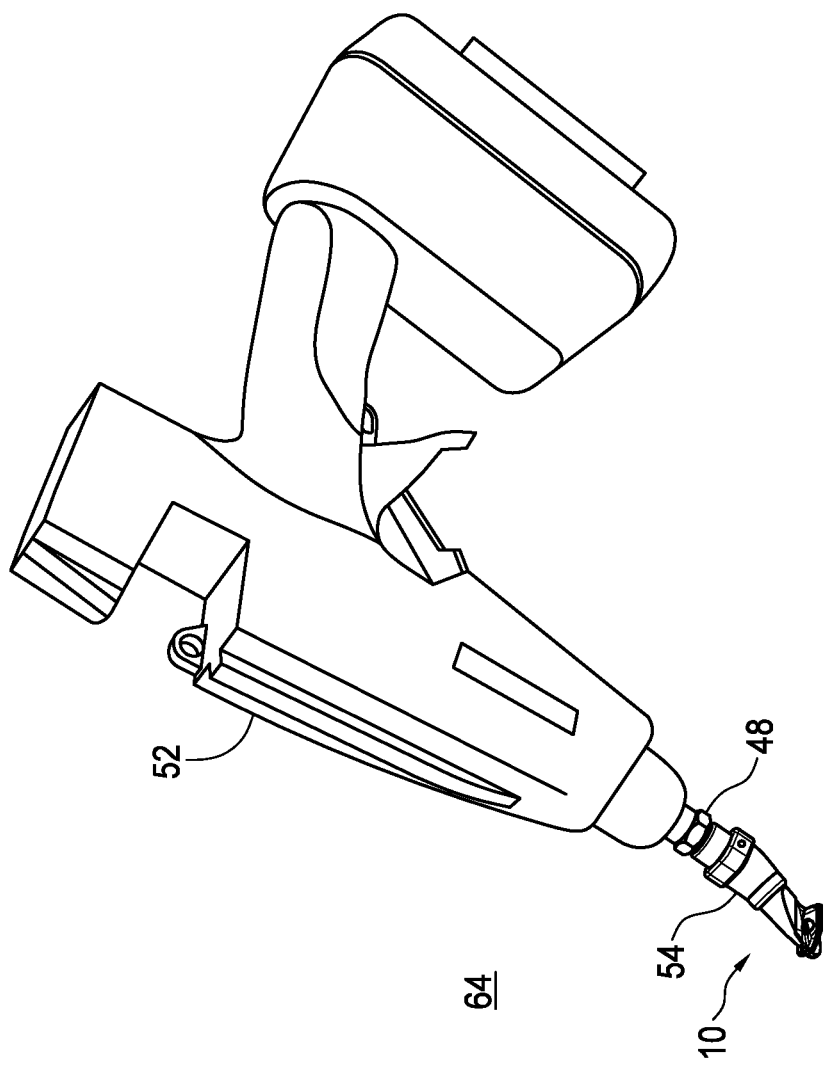
FIG. 13 is a perspective view depicting a prototype seaming adhesive applicator tip attached to a glue gun.
Figure 14:
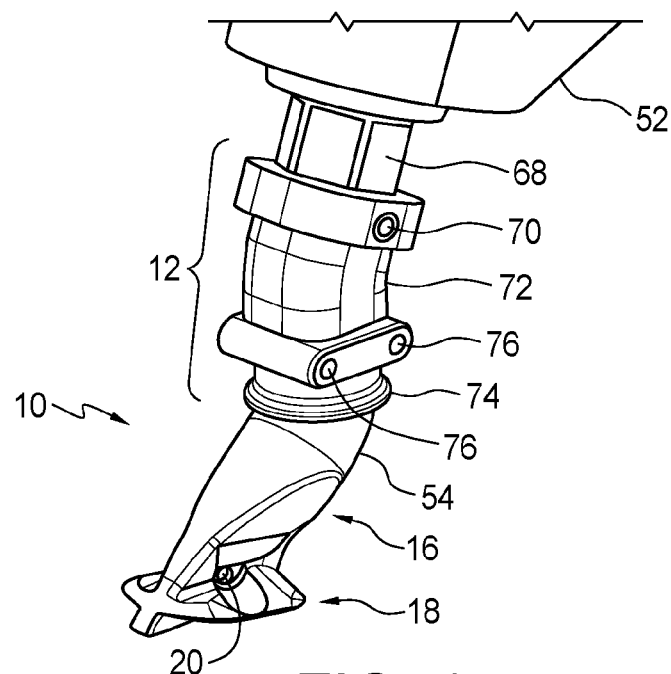
FIG. 14 is a perspective view depicting a sixth embodiment of a seaming adhesive applicator tip attached to a glue gun.
Figure 15:
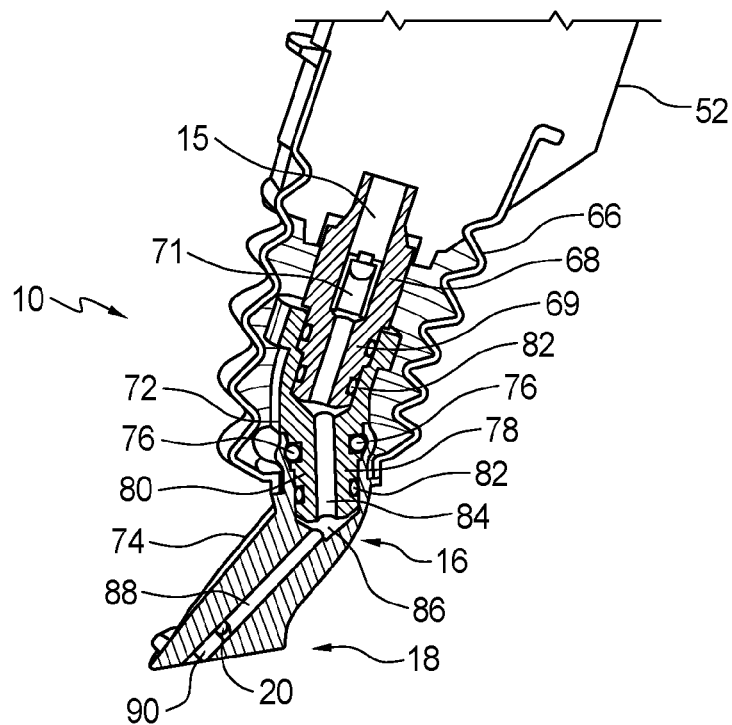
FIG. 15 is a perspective cut-away view depicting the seaming adhesive applicator tip of FIG. 14.
Figure 16:
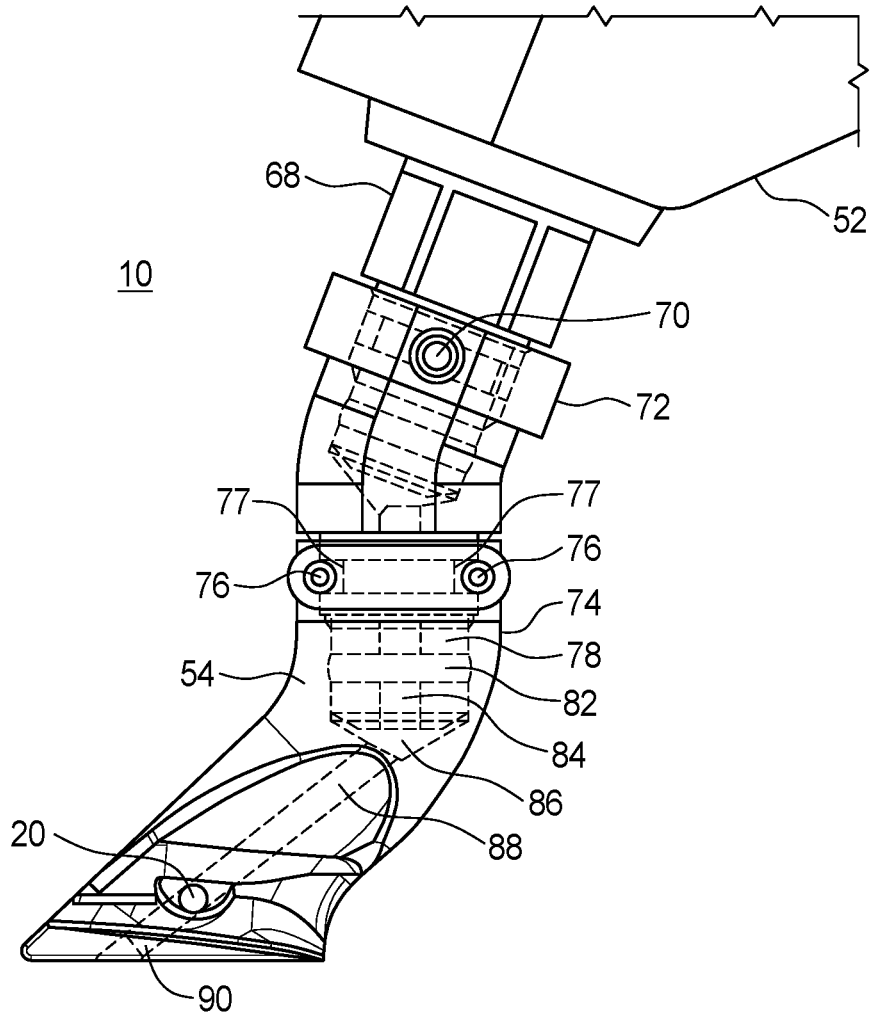
FIG. 16 is a side elevation cut-away view depicting the seaming adhesive applicator tip of FIG. 14.

Referring to FIGS. 6 and 7, an alternate embodiment of applicator tip 10 is shown. In some embodiments, applicator tip 10 can comprise elbow 54 disposed on leg portion 12, wherein elbow 54 can comprise collar 56 and setscrew 58 disposed thereon for attaching to a glue gun (not shown). Elbow 54 can further comprise passageway 60 extending therethrough to provide communication to passageway 15, as shown in FIG. 3, wherein passageway 60 comprises a longitudinal axis that is substantially aligned or parallel with the connection between applicator tip 10 and glue gun 52, as shown in FIG. 13 sitting on top of floor-covering 64. In some embodiments, elbow 54 can comprise a bend therein to extend foot portion 18 forward from the longitudinal axis of passageway 60 to make applicator tip 10 visible and not obscured by glue gun 52, as shown in FIG. 13, thus providing a visual sight or guide to an installer as to the location of applicator tip 10 when seaming pieces of floor-covering together. In some embodiments, the angle of the bend can range from 20° to 25°, although it is obvious to those skilled in the art that the angle of the bend can be selected to any suitable angle, greater or smaller than this range, so as to put applicator tip 10 in a visible position on any given make or model of glue gun. In some embodiments, elbow 54 can comprise heat shield 62 disposed thereon to provide means to prevent an installer from burning themselves on applicator tip 10 when it is connected to a glue gun and receiving heated hot melt adhesive therefrom. In some embodiments, heat shield 62 can comprise silicone or silicon rubber.

Referring to FIGS. 8 and 9, another embodiment of applicator tip 10 is shown. In some embodiments, elbow 54 can couple to collar 44, disposed on leg portion 12, and be secured by setscrew 46. In further embodiments, applicator tip 10 can be coupled to glue gun 52 via elbow 54 coupling with check valve 48 and secured by setscrew 58 disposed through collar 56. In some embodiments, applicator tip 10 can comprise heat shield 63 disposed on elbow 54 to provide means to prevent an installer from burning themselves on elbow 54 when connected to glue gun 52 and receiving heated hot melt adhesive therefrom. In some embodiments, heat shield 63 can comprise silicone or silicon rubber.

Figure 12:
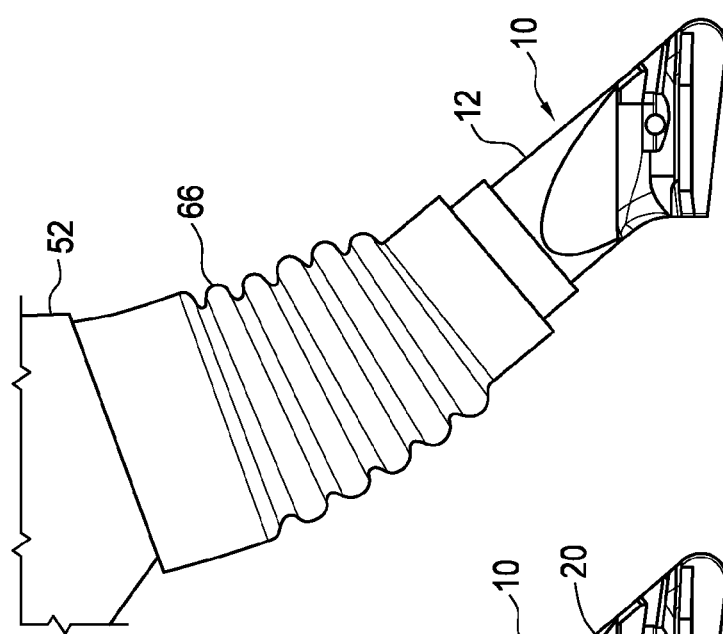
FIG. 12 is a side elevation view depicting the applicator tip of FIG. 10 with a heat shroud, displayed as opaque.
Figure 11:
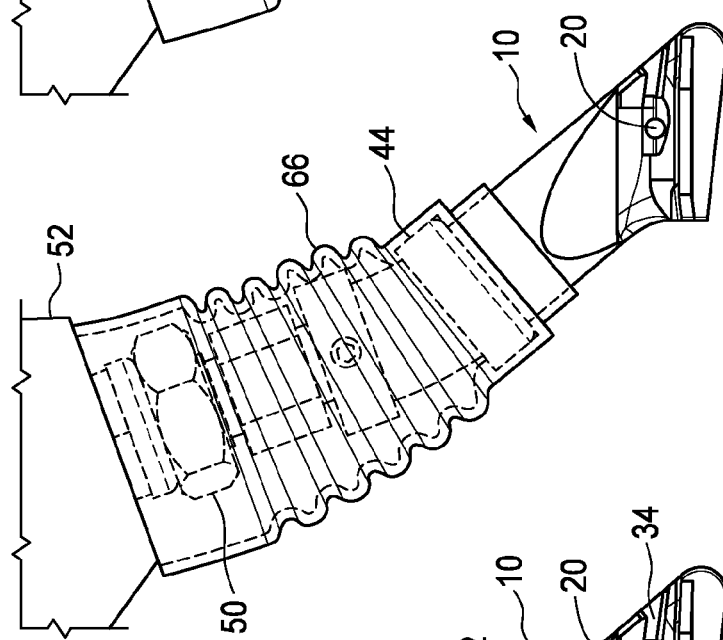
FIG. 11 is a side elevation view depicting the applicator tip of FIG. 10 with a heat shroud, displayed as transparent.
Figure 10:
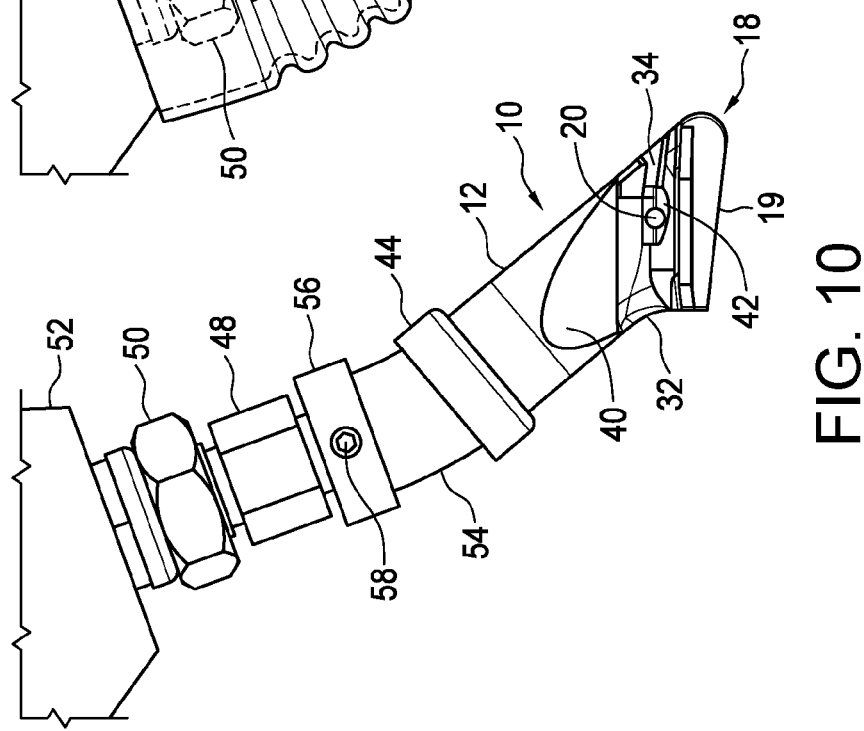
FIG. 10 is a side elevation view depicting a fifth embodiment of a seaming adhesive applicator tip attached to a glue gun.

Referring to FIG. 10, a side view is provided of the applicator tip 10 of FIG. 8 attached to glue gun 52 via check valve 48 and coupler adaptor 50. In FIG. 11, heat shield boot 66 is shown disposed on applicator tip 10 and elbow 54 to provide means to prevent an installer from burning themselves on elbow 54 when connected to glue gun 52 and receiving heated hot melt adhesive therefrom, wherein heat shield boot 66 is shown in transparent form so as to show the elements contained therein. In FIG. 12, heat shield boot 66 is shown as an opaque element in the drawing. In some embodiments, heat shield boot 66 can comprise corrugations to provide flexibility. In some embodiments, heat shield boot 66 can extend from coupler adaptor 50 to leg portion 12. In some embodiments, heat shield boot 66 can comprise silicone or silicon rubber.

In operation, an installer can draw applicator tip between two adjacent pieces of floor-covering that are to be seamed together. Glue channel opening 32 can draw the edges of the adjacent pieces of floor-covering into glue channel 34 while sliding on top of top surface 26 of wedges 22. In so doing, seaming adhesive can be dispensed from orifice 20 into recess 42 as the installer squeezes the seaming adhesive bottle or operates the thermoplastic adhesive dispensing device, such as a glue gun. As orifice 20 is disposed intersecting with recessed area 30, seaming adhesive can be applied to the edges of the adjacent pieces of floor-covering with little or no seaming adhesive being dispensed on the top surface of the floor-covering material. Furthermore, as the top surface of recessed areas 30 and 42 is disposed below top surface 26, seaming adhesive being dispensed from orifice 20 can be applied to the bottom surface of the edges of the adjacent pieces of floor-covering being seamed together, which can then adhere to a seaming tape disposed beneath the adjacent pieces of floor-covering (not shown) to strengthen the finished seam.

Figure 17:
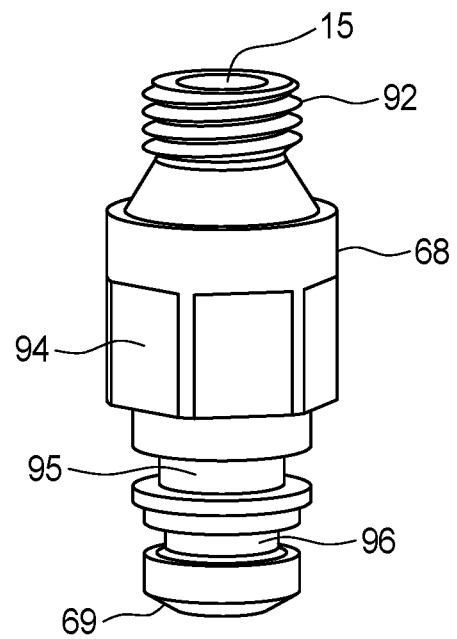
FIG. 17 is a perspective view depicting a coupler for use with the seaming adhesive applicator tip of FIG. 14.

Referring to FIGS. 14 to 21, another embodiment of applicator 10 is shown. In this embodiment, leg portion 12 can comprise elbow member 72 that, in turn, can be pivotally or swivelly attached to lower leg portion 74. In some embodiments, elbow member 72 can be attached to glue gun 52 via coupler 68, shown in further detail in FIG. 17. In some embodiments, coupler 68 can comprise threaded end 92 for threadably attaching to glue gun 52. Coupler 68 can further comprise one or more wrench flats 94 to enable coupler to be threadably coupled to glue gun 52 with a wrench (not shown), as well known to those skilled in the art. Referring to FIG. 17, coupler 68 can further comprise groove 95, disposed therearound on pin 69, to receive setscrew 70 when pin 69 is inserted into socket 71 of elbow 72 to fasten coupler 68 and elbow 72 together. Coupler 68 can further comprise groove 96 disposed therearound to receive an o-ring 82, disposed between coupler 68 and elbow 72 as a sealing member.

Figure 18:
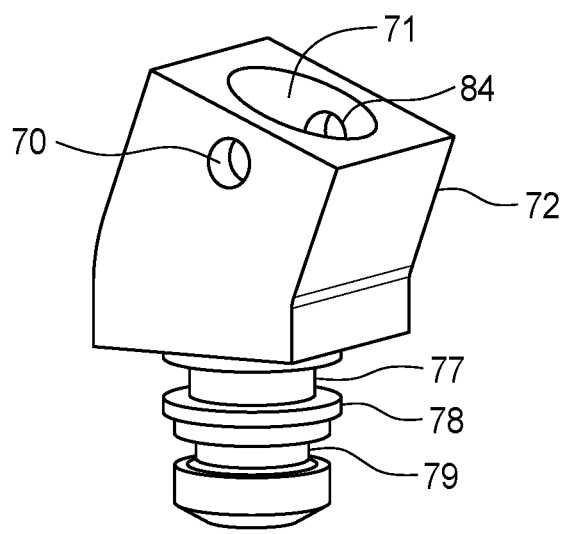
FIG. 18 is a perspective view depicting an elbow for use with the seaming adhesive applicator tip of FIG. 14.
Figure 20:
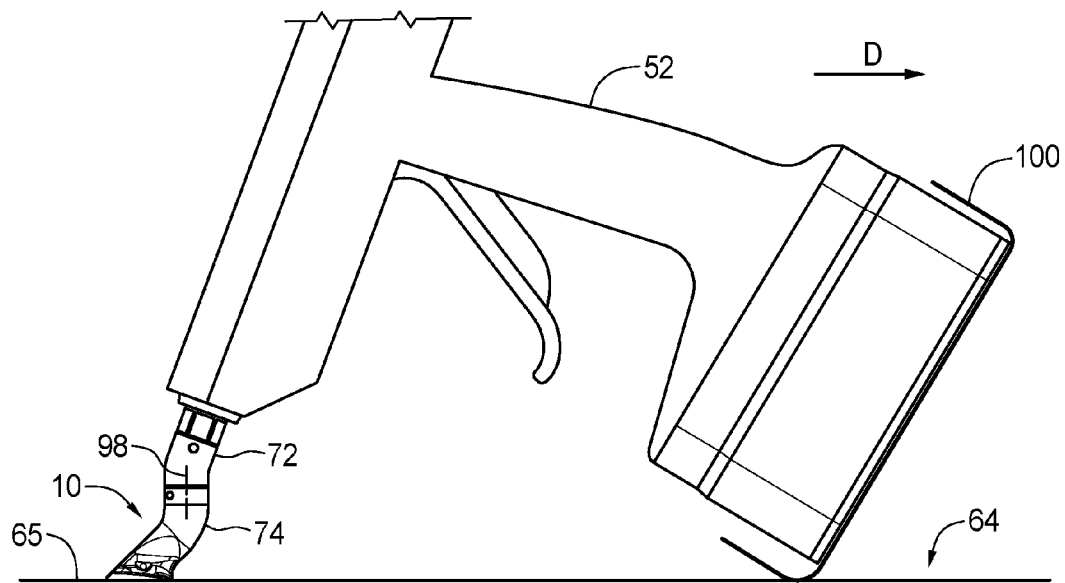
FIG. 20 is a side elevation view depicting the seaming adhesive applicator tip of FIG. 14 attached to a glue gun.
Figure 21:
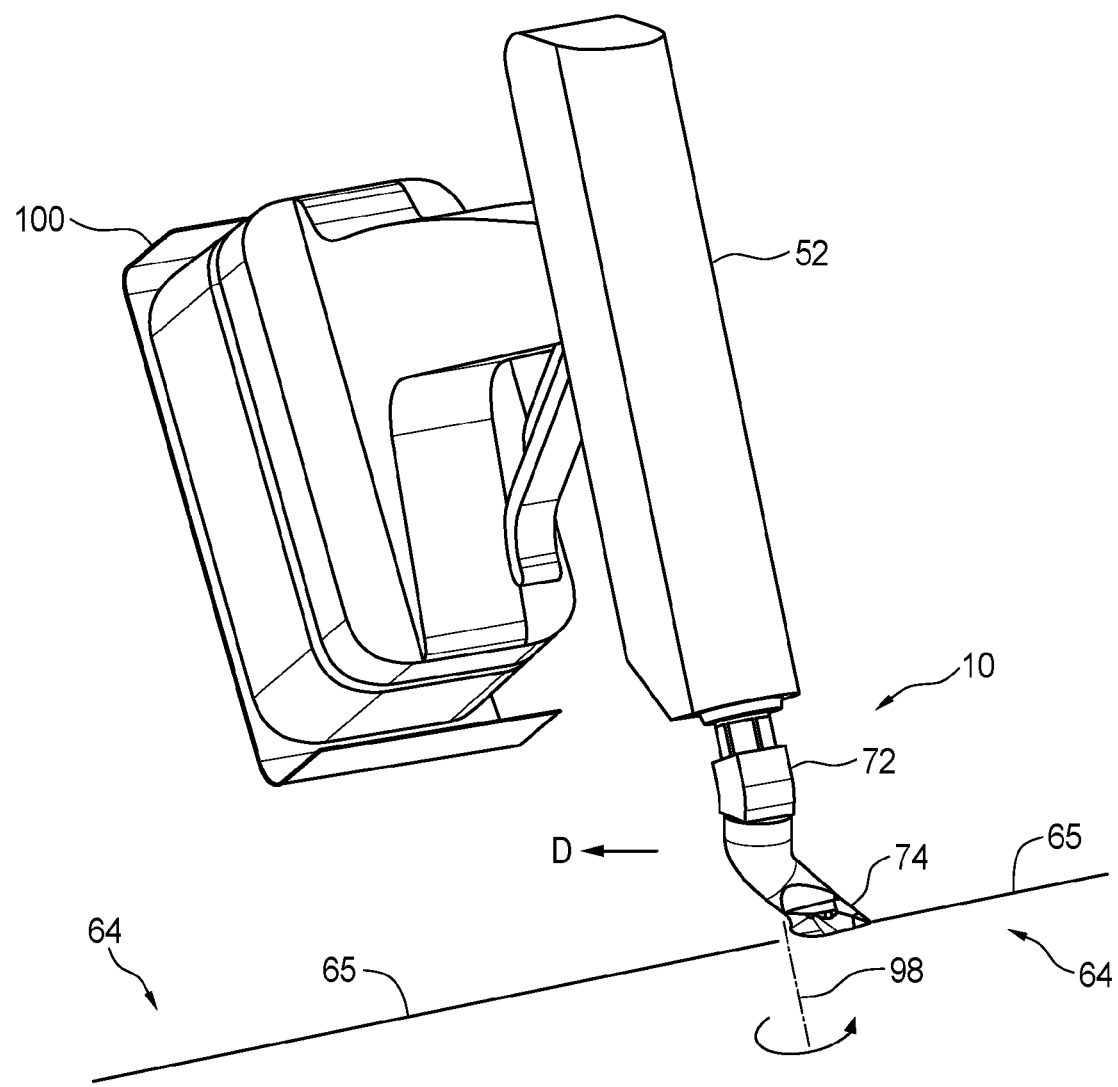
FIG. 21 is perspective view depicting the seaming adhesive applicator tip of FIG. 20 in a swiveled position.

Referring to FIG. 18, in some embodiments, elbow 72 can comprise socket 71 for receiving pin 69 of coupler 68. Elbow 72 can further comprise pin 78 configured for insertion into socket 80 of lower leg portion 74. Pin 78 can further comprise channel 77 disposed therearound for receiving one or more spring pin 76 as a means to secure lower leg portion 74 to elbow 72 and to further enable lower leg portion 74 to swivel or pivot about axis 98, as shown in FIGS. 20 and 21. Pin 78 can further comprise groove 79 disposed therearound to receive an 82 o-ring disposed between elbow 72 and lower leg portion 74 as a sealing member.

When coupler 68, elbow 72 and lower leg portion 74 are assembled together, passageway 15 can communicate with passageway 84 disposed through elbow 72, which can further communicate with passageway 88 disposed through lower leg portion 74 via plenum 86 to establish a communication path from glue gun 52 to orifice 20 disposed in foot portion 18 of applicator tip 10.

Figure 19:
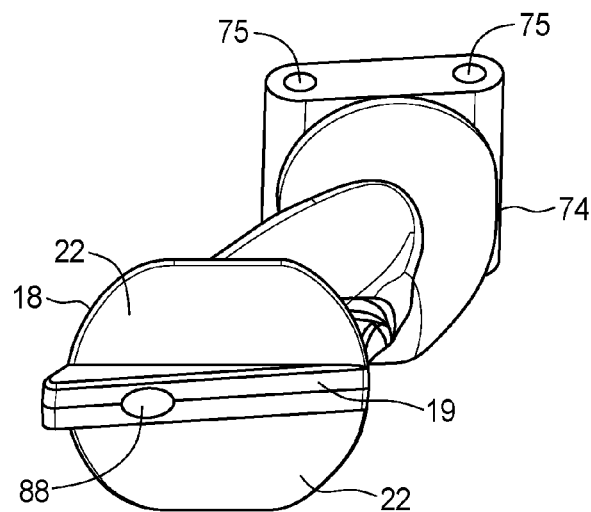
FIG. 19 is a bottom perspective view depicting the seaming adhesive applicator tip of FIG. 14.

Referring to FIG. 19, in some embodiments, lower leg portion 74 can comprise passageway 88 all the way through to the end of keel 19. This can be provided as a means to provide the communication between passageway 15 and orifice 20 by drilling a single hole, to simplify the manufacture thereof. In some embodiments, passageway 88 can be a 3/32" hole drilled from the bottom of keel 19 to plenum 86. Once drilled, plug 90 can be inserted between the bottom of keel 19 and orifice 20 to the seal the end of passageway 88 and prevent any adhesive extending past orifice 20 and exiting applicator tip 10 from the bottom of keel 19.

Referring to FIG. 20, applicator 10 of FIGS. 14 to 19 is shown attached to glue gun 52. In this figure, elbow 72 and lower leg portion 74 are aligned similar to the embodiments of applicator tip 10 as shown in FIGS. 1 to 13. In this configuration, glue gun 52 can be drawn in direction D by a carpet installer to seam two pieces of carpet 64 along seam 65, wherein the direction of seam 65 is substantially aligned with direction D. In some embodiments, glide pad 100 can be installed on glue gun 52 to reduce the friction of sliding glue gun 52 on carpet 64, and make the installation process easier for the carpet installer.

Referring to FIG. 21, lower leg portion 74 has been rotated approximately 90 degrees about axis 98 relative to elbow 72. In this configuration, glue gun 52 can be drawn along sideways along seam 65. This can enable the use of applicator tip 10 to seam carpet along a seam that is close to a wall or other obstacle that would be otherwise prevent the use of glue gun 52. Another example of a use of applicator tip 10 having the ability to swivel or pivot include completing a carpet seam that is located in a doorway running from door jamb to door jamb. By being able to swivel, applicator tip 10 can apply adhesive to the carpet seam in one operation; otherwise, the seam would need to be done in at least two operations: starting from one door jamb until glue gun 52 reaches the other door jamb, and then completing the seam by starting from the other door jamb and moving back towards the first door jamb. For narrow doorways, the size of glue gun 52 may prevent to be able to complete the seam at all.

Another example of use of applicator 10 comprising the ability to swivel is seaming carpet along curves or non-straight lines. This allows the carpet installer to draw applicator tip 10 along any seam direction without necessarily having glue gun 52 to travel along the same path.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

We claim:

1. A seaming adhesive applicator tip for seaming abutting side-by-side pieces of floor-covering planar material with adhesive along a line of abutment, the applicator tip comprising:
   a) an upright body comprising, from top to bottom, a leg portion, an ankle portion, and a foot portion, the body having a leading edge and a trailing edge which are aligned with the line of abutment;
   b) the leg portion forming a passageway extending longitudinally therethrough, the leg portion comprising connection means at an upper end thereof for connection with a seaming adhesive dispenser, whereby seaming adhesive may flow from the dispenser into the leg passageway;
   c) the foot portion having a pairing of opposing wedges extending sideways from the body for uplifting and tilting edges of the pieces of floor-covering planar material upwards and bringing the edges close to the ankle portion side surfaces as the applicator tip is advanced along the line of abutment, each of the wedges further comprising a downward sloping top surface and a flat bottom surface, the wedges further comprising a first recessed area disposed on a portion of the top surface nearer the trailing edge, the foot portion further comprising an angled keel extending downwards therefrom, wherein the angled keel is angled with respect to the flat bottom surface; and
   d) the ankle portion comprising having an ankle orifice extending through the ankle portion transverse to the line of abutment and intersecting with the passageway, a bottom edge of the ankle orifice further intersecting with the first recessed area, whereby seaming adhesive flowing into the passageway is directed through the ankle orifice towards the edges of the pieces of floor-covering being seamed together and the bottom surfaces thereof.

2. The applicator tip as set forth in claim 1, further comprising a second recessed area disposed on the top surface adjacent to the ankle orifice, the second recessed area distinct from the first recessed area.

3. The applicator tip as set forth in claim 1, wherein the ankle portion further comprises a glue channel disposed thereon for guiding the pieces of floor-covering planar material along the ankle orifice.

4. The applicator tip as set forth in claim 3, wherein the glue channel further comprises a glue channel opening disposed on the leading edge of the body.

5. The applicator tip as set forth in claim 4, wherein the glue channel opening is wider than the glue channel and gradually narrows to the width of the glue channel to guide pieces of floor-covering planar material into the glue channel.

6. The applicator tip as set forth in claim 1, wherein the angled keel rises in elevation with respect to the flat bottom surface from the trailing edge to the leading edge.

7. The applicator tip as set forth in claim 1, further comprising opposing and sloping sidewalls disposed on opposing sides of the leg portion, wherein the applicator tip narrows in width from an upper end of the leg portion downwardly to the ankle portion.

8. The applicator tip as set forth in claim 1, wherein the leg portion further comprises an elbow configured to extend the foot portion away from the leg portion.

9. The applicator tip as set forth in claim 8, wherein the elbow comprises a swivel member to enable the ankle and foot portions to swivel about an axis relative to the upper end of the leg portion.

10. A method for seaming adjacent pieces of floor-covering planar material, the method comprising:
    a) fitting the adjacent pieces of floor-covering planar material together wherein edges of the adjacent pieces are abutted to one another;

b) providing a seaming adhesive applicator tip for seaming the abutting side-by-side pieces of floor-covering planar material with adhesive along a line of abutment, the applicator tip comprising:
   i) an upright body comprising, from top to bottom, a leg portion, an ankle portion, and a foot portion, the body having a leading edge and a trailing edge which are aligned with the line of abutment,
   ii) the leg portion forming a passageway extending longitudinally therethrough, the leg portion comprising connection means at an upper end thereof for connection with a seaming adhesive dispenser, whereby seaming adhesive may flow from the dispenser into the leg passageway,
   iii) the foot portion having a pairing of opposing wedges extending sideways from the body for uplifting and tilting edges of the pieces of floor-covering planar material upwards and bringing the edges close to the ankle portion side surfaces as the applicator tip is advanced along the line of abutment, each of the wedges further comprising a downward sloping top surface and a flat bottom surface, the wedges further comprising a first recessed area disposed on a portion of the top surface nearer the trailing edge, the foot portion further comprising an angled keel extending downwards therefrom, wherein the angled keel is angled with respect to the flat bottom surface, and
   iv) the ankle portion comprising having an ankle orifice extending through the ankle portion transverse to the line of abutment and intersecting with the passageway, a bottom edge of the ankle orifice further intersecting with the first recessed area, whereby seaming adhesive flowing into the passageway is directed through the ankle orifice towards the edges of the pieces of floor-covering being seamed together and the bottom surfaces thereof;
c) placing the applicator tip between the abutting side-by-side pieces of floor-covering planar material and dispensing adhesive along the edge and the bottom surface of at least one piece of floor-covering planar material; and
d) pressing the edges of the abutting side-by-side pieces of floor-covering planar material until the adhesive has at least partially set so as to form a finished seam along the line of abutment.

11. The method as set forth in claim 10, wherein the applicator tip further comprises a second recessed area disposed on the top surface adjacent to the ankle orifice, the second recessed area distinct from the first recessed area.

12. The method as set forth in claim 10, wherein the ankle portion further comprises a glue channel disposed thereon for guiding the pieces of floor-covering planar material along the ankle orifice.

13. The method as set forth in claim 12, wherein the glue channel further comprises a glue channel opening disposed on the leading edge of the body.

14. The method as set forth in claim 13, wherein the glue channel opening is wider than the glue channel and gradually narrows to the width of the glue channel to guide pieces of floor-covering planar material into the glue channel.

15. The method as set forth in claim 10, wherein the angled keel rises in elevation with respect to the flat bottom surface from the trailing edge to the leading edge.

16. The method as set forth in claim 10, wherein the applicator tip further comprises opposing and sloping sidewalls disposed on opposing sides of the leg portion, wherein the applicator tip narrows in width from an upper end of the leg portion downwardly to the ankle portion.

17. The method as set forth in claim 10, wherein the leg portion further comprises an elbow configured to extend the foot portion away from the leg portion.

18. The method as set forth in claim 17, wherein the elbow comprises a swivel member to enable the ankle and foot portions to swivel about an axis relative to the upper end of the leg portion.

19. The method as set forth in claim 10, further comprising: dispensing an adhesive on the abutting edges of both side-by-side pieces of floor-covering planar material.

20. The method as set forth in claim 10, wherein the forming the finished seam along the line of abutment further comprises advancing the applicator tip from one end of the line of abutment towards an opposite end thereof.

21. The method as set forth in claim 20, wherein the forming the finished seam further comprises seaming successive portions of the abutting side-by-side pieces of the floor-covering planar material one portion at a time.

* * * * *